US012140746B1

(12) United States Patent
Hui

(10) Patent No.: US 12,140,746 B1
(45) Date of Patent: Nov. 12, 2024

(54) NIGHT VISION DEVICE

(71) Applicant: SHENZHENZ.T.DIGITAL CO., LTD, Shenzhen (CN)

(72) Inventor: Wai Lun Hui, Shenzhen (CN)

(73) Assignee: SHENZHENZ.T.DIGITAL CO., LTD, Shenzhen (CN)

( * ) Notice: Subject to any disclaimer, the term of this patent is extended or adjusted under 35 U.S.C. 154(b) by 0 days.

(21) Appl. No.: 18/677,363

(22) Filed: May 29, 2024

(30) Foreign Application Priority Data

Nov. 14, 2023 (CN) .......................... 202311519481.2

(51) Int. Cl.
*G02B 23/18* (2006.01)
*G02B 23/12* (2006.01)
*G06F 3/14* (2006.01)

(52) U.S. Cl.
CPC .......... *G02B 23/125* (2013.01); *G02B 23/18* (2013.01); *G06F 3/14* (2013.01)

(58) Field of Classification Search
None
See application file for complete search history.

(56) References Cited

U.S. PATENT DOCUMENTS

| 5,986,803 | A  | * | 11/1999 | Kelly  | H04N 5/772 |
|           |    |   |         |        | 386/E5.072 |
| D496,672  | S  | * | 9/2004  | Hines  | D16/133    |
| D504,144  | S  | * | 4/2005  | Lee    | D16/133    |
| D544,897  | S  | * | 6/2007  | Mullett| D16/133    |
| 2001/0028498 | A1 | * | 10/2001 | Haga   | G02B 23/18 |
|           |    |   |         |        | 359/410    |
| 2004/0081422 | A1 | * | 4/2004  | Kawano | G02B 23/18 |
|           |    |   |         |        | 348/E5.026 |
| 2006/0181768 | A1 | * | 8/2006  | Chan   | G02B 23/00 |
|           |    |   |         |        | 359/410    |

* cited by examiner

Primary Examiner — Derek S. Chapel
(74) Attorney, Agent, or Firm — Andrew C. Cheng

(57) ABSTRACT

The present disclosure provides a night vision device that includes a base, an outer screen installed on the base and configured to display images of the outside world, and two barrel members respectively hinged on both sides of the base, the two barrel members rotated to adjust a distance therebetween, the base including a main member and a receiving member arranged on a side of the main member, a width of the main member smaller than that of the receiving member, the main member including two arc-shaped recesses for respectively receiving the two barrel members therein; the two barrel members located on the same side of the receiving member, and the outer screen hinged on the receiving member. The present disclosure can simultaneously have functions of adjusting a pupil distance and observing from the outer screen.

16 Claims, 9 Drawing Sheets

NIGHT VISION DEVICE

1. CROSS-REFERENCE TO RELATED APPLICATION

This application claims the benefit of priority from Chinese Patent Application No. 202311519481.2 entitled "NIGHT VISION DEVICE" and filed on Nov. 14, 2023, the content of which is hereby incorporated by reference in its entire by reference.

BACKGROUND

2. Technical Field

The present disclosure generally relates to the field of night vision technologies, and especially relates to a night vision device.

3. Description of Related Art

A night vision device is a type of night vision equipment typically used for tasks that need to free hands, and can also be designed to be worn on a head and be used for night walking, military operations, search and rescue missions, and so on. The night vision device has a night vision function and an adjustable magnification function, which is usually designed with a single barrel or a pair of barrels. The night vision device with a pair of barrels allow users to observe with both eyes simultaneously, resulting in providing a stereoscopic field of view, which helps improve accuracy of attempted perception and observation. However, it is easy to cause visual limitations during using the night vision device with the pair of barrels, which is difficult to observe the surroundings out of an eyepiece of the night vision device in a timely manner and inconvenient for users.

SUMMARY

The technical problems to be solved: in view of the shortcomings of the related art, the present disclosure provides a night vision device which can facilitate users in observing surrounding environments.

A night vision device according to an embodiment of the present disclosure includes: a base, an outer screen and two barrel members, the two barrel members respectively hinged on both sides of the base and rotated to adjust a distance therebetween, the outer screen installed on the base and configured to display images of the outside world; and the base including a main member and a receiving member arranged on a side of the main member, a width of the main member smaller than that of the receiving member, the main member including two arc-shaped recesses for respectively receiving the two barrel members therein; the two barrel members located on the same side of the receiving member, and the outer screen hinged on the receiving member.

The present disclosure provides the advantages as below: the night vision device provides that the barrel member is hinged with the base so that a distance between two lens barrels (that is: adjusting a pupil distance thereof) within a certain range can be adjusted, so as to adapt to users with different pupil distances. The barrel member is also convenient for being gripped by users. There are two arc-shaped recesses arranged on the base to provide a sufficient space for installing the two barrel members, which has a compact structure thereof. A width of the receiving member of the base is also enough to install the outer screen thereof, so that the outer screen is easy to be unfolded and folded for users to observe. Users can directly observe the outside world through the barrel member, as well as the outer screen, and users can also use a recording mode thereof to obtain an effect of taking photos and videos, which has a plurality of functions and is convenient for being used and recorded.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

The element labels according to the embodiment of the present disclosure shown as below:

10 base, 11 main member, 12 receiving member, 121 receiving room, 1211 bottom wall, 122 receiving chamber, 123 groove, 124 clamp, 125 installing portion, 126 fixing portion, 13 recess, 14 opening, 15 connecting portion, 16 supporting portion, 20 outer screen, 21 second rotating member, 22 clamping portion, 23 protrusion, 30 barrel member, 31 body, 311 inserting member, 312 first rotating member, 32 eyepiece member, 33 objective lens member, 34 inner screen, 35 focusing member, 36 eye protecting cover, 40 compass, 50 lamp, 60 camera module, 70 infrared module, 80 main circuit board, 81 first circuit board, 82 second circuit board, 90 control button.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should also be understood that the terms used in the specification of the present disclosure are only for the purpose of describing specific embodiments without being intended to limit the present disclosure. As used in the description of the present disclosure and the appended claims, terms of "one", "one" and "the" in a singular form are intended to include a plural form unless the context clearly indicates otherwise.

It should also be further understood that the term "and/or" used in the description of the present disclosure and the appended claims refers to any combination of one or more of associated listed items and all possible combinations, and includes these combinations.

Figure 1:
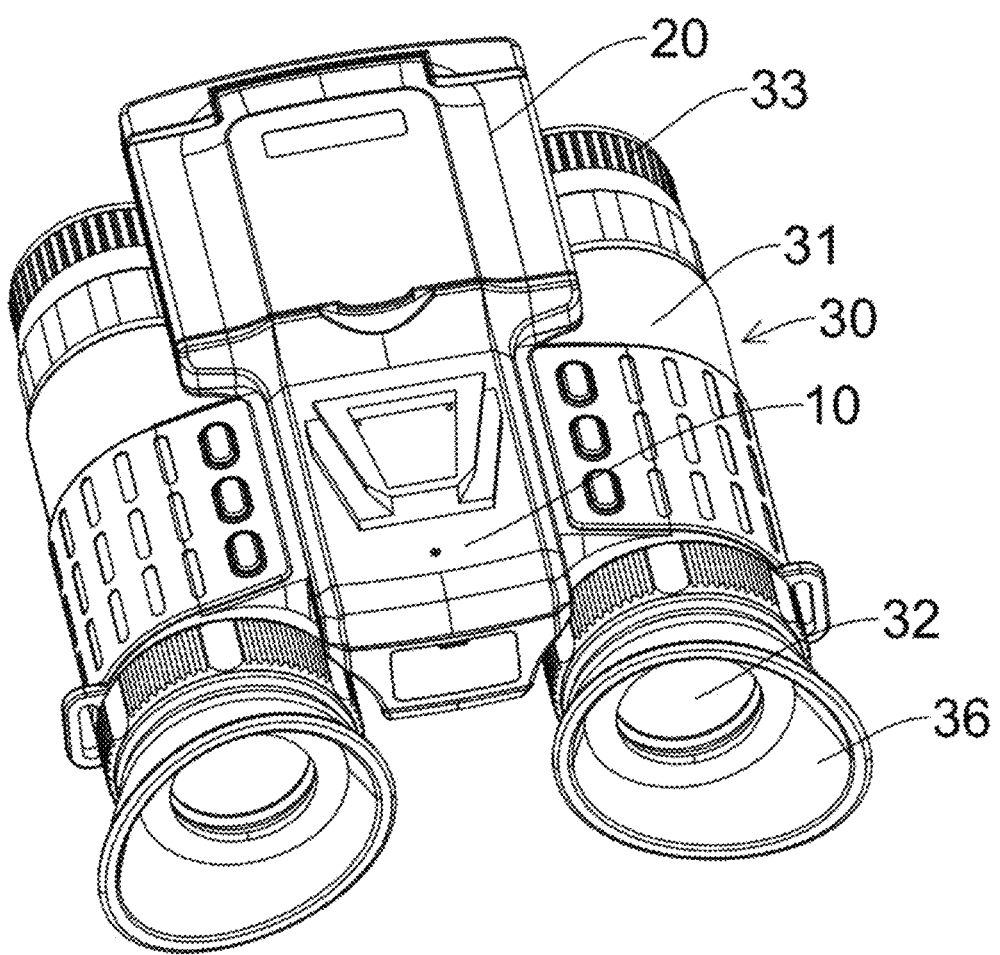
FIG. 1 is a schematic view of a night vision device in accordance with an embodiment of the present disclosure.
Figure 2:
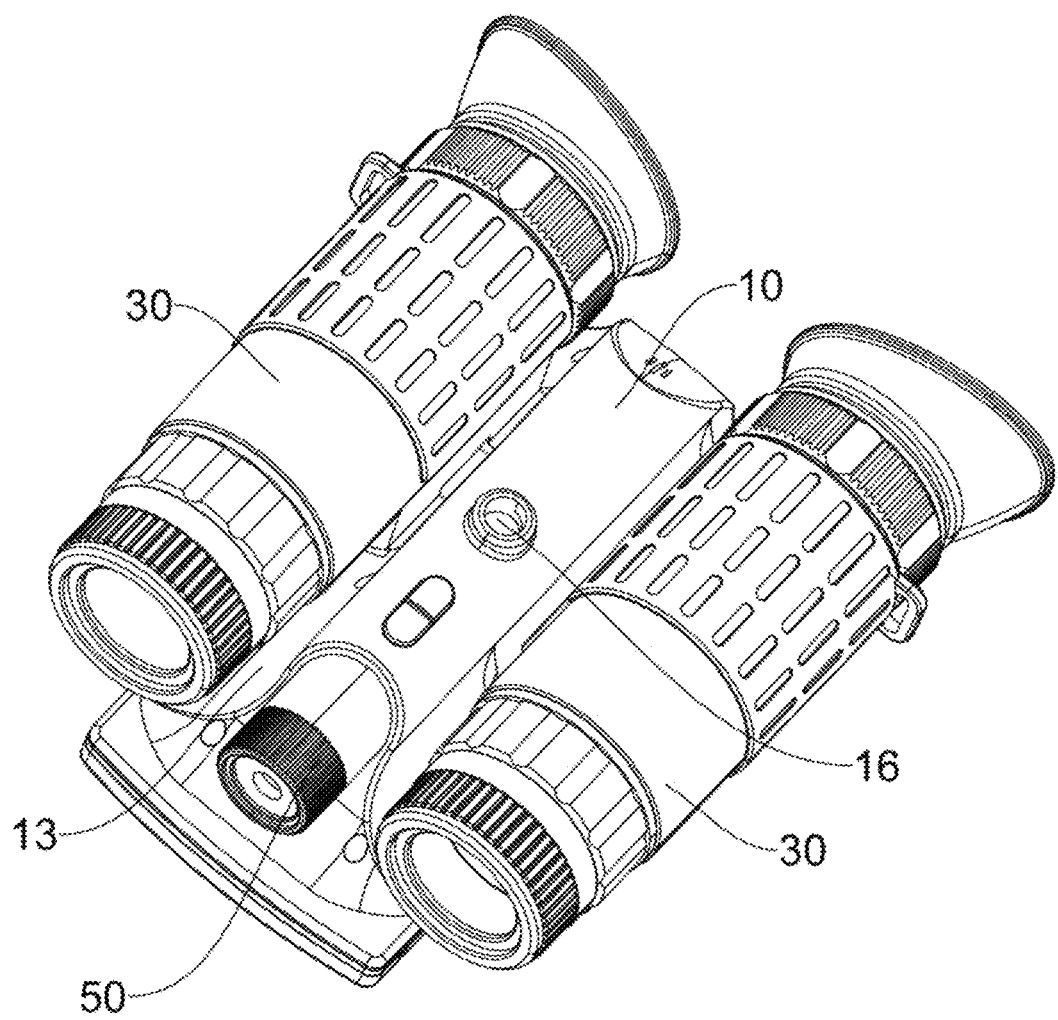
FIG. 2 is similar to FIG. 1, but shown from another view.
Figure 3:
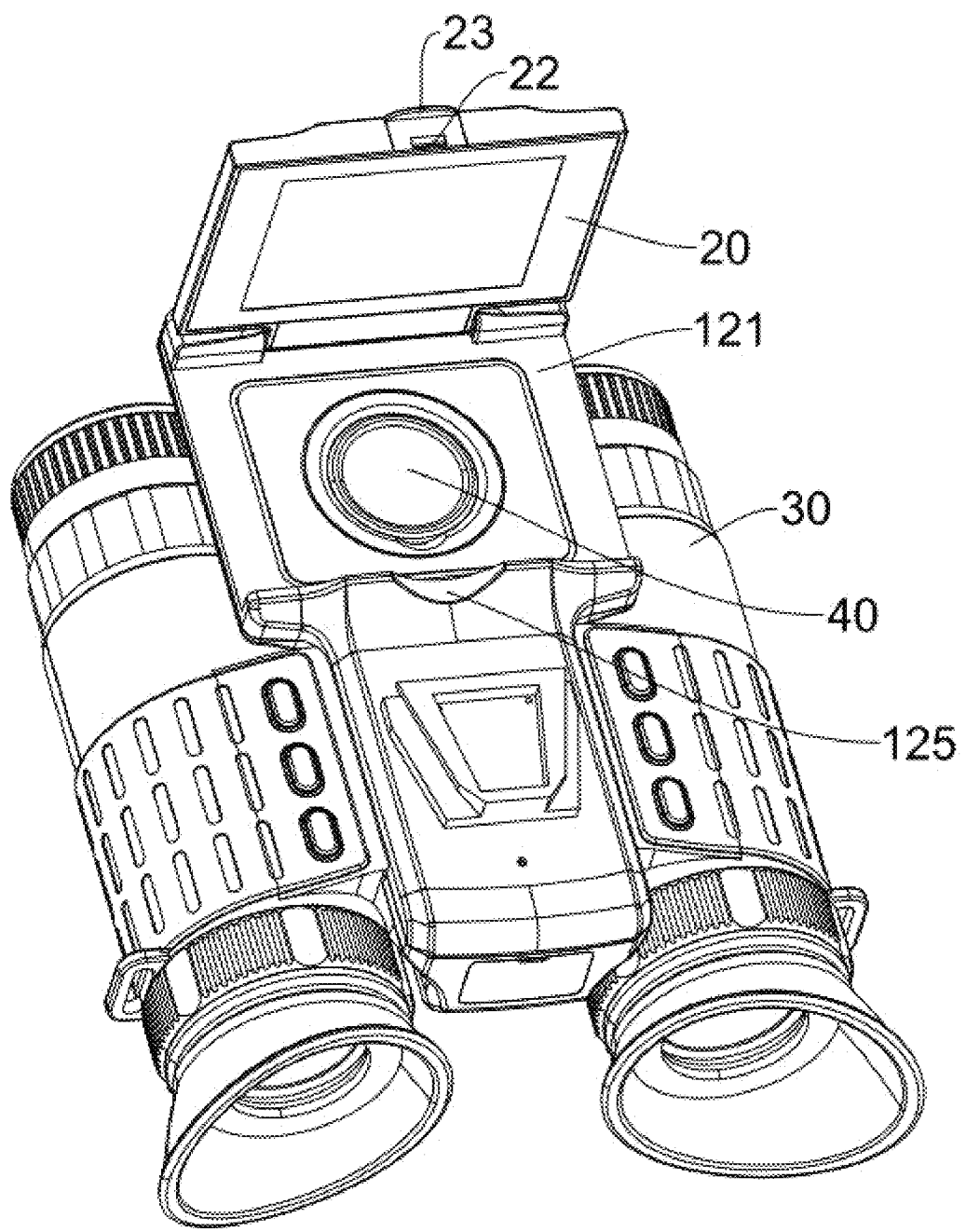
FIG. 3 is a schematic view of an outer screen of the night vision device of FIG. 1, shown the outer screen in an unfold state.
Figure 4:
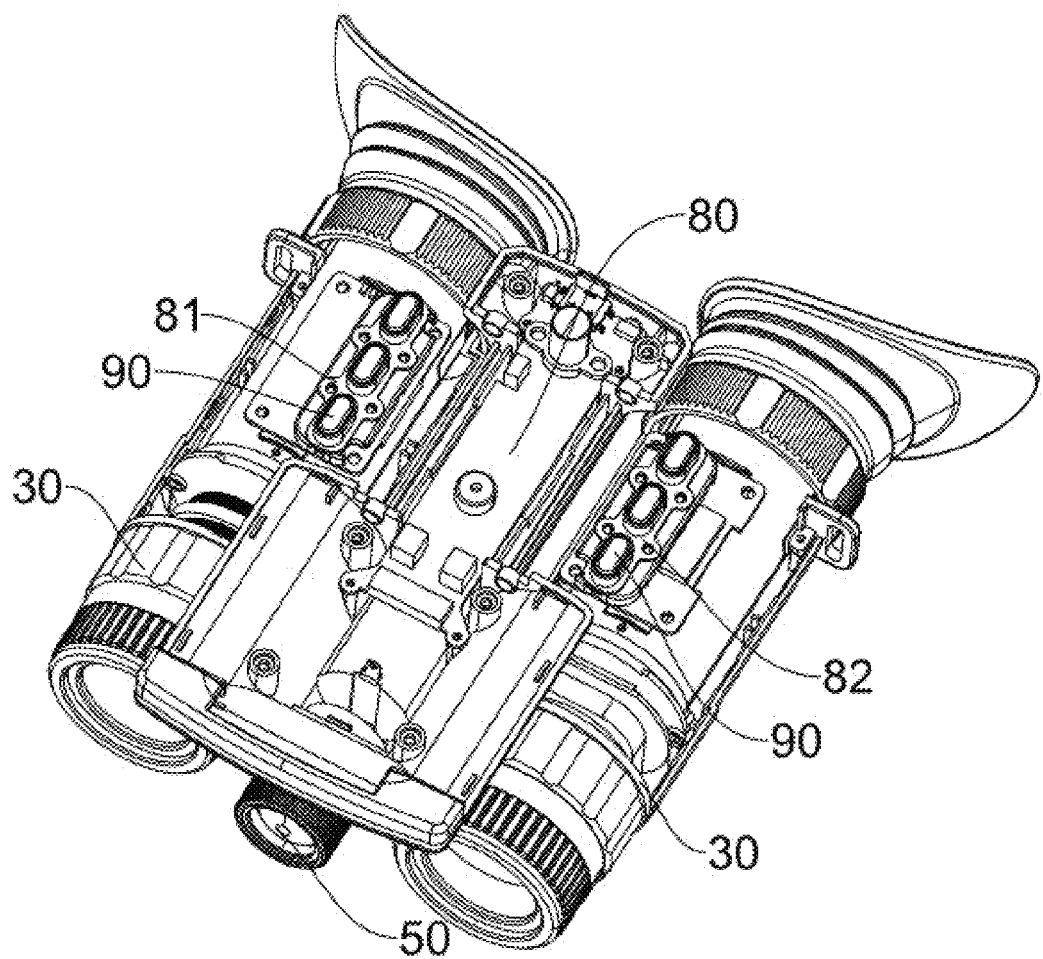
FIG. 4 is a partial schematic view of the night vision device of FIG. 1.
Figure 5:
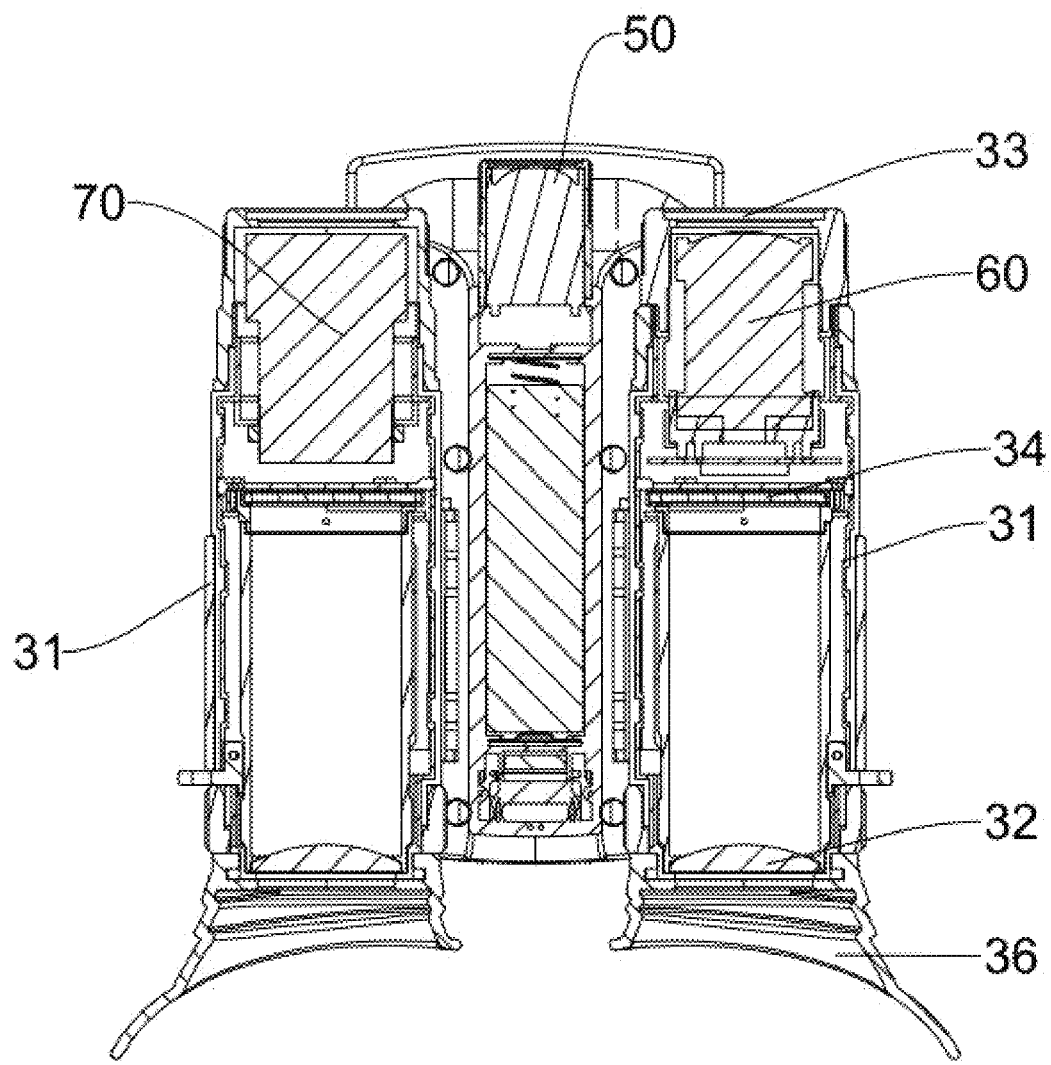
FIG. 5 is a cross sectional view of the night vision device of FIG. 1
Figure 6:
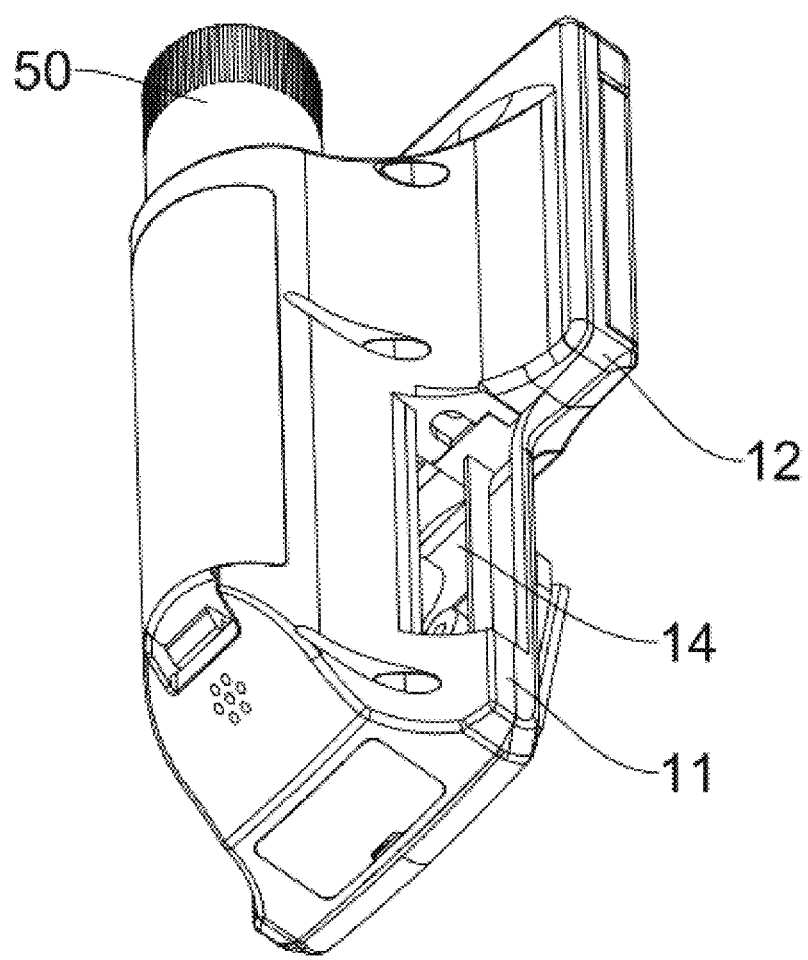
FIG. 6 is a schematic view of a base of the night vision device of FIG. 1.
Figure 7:
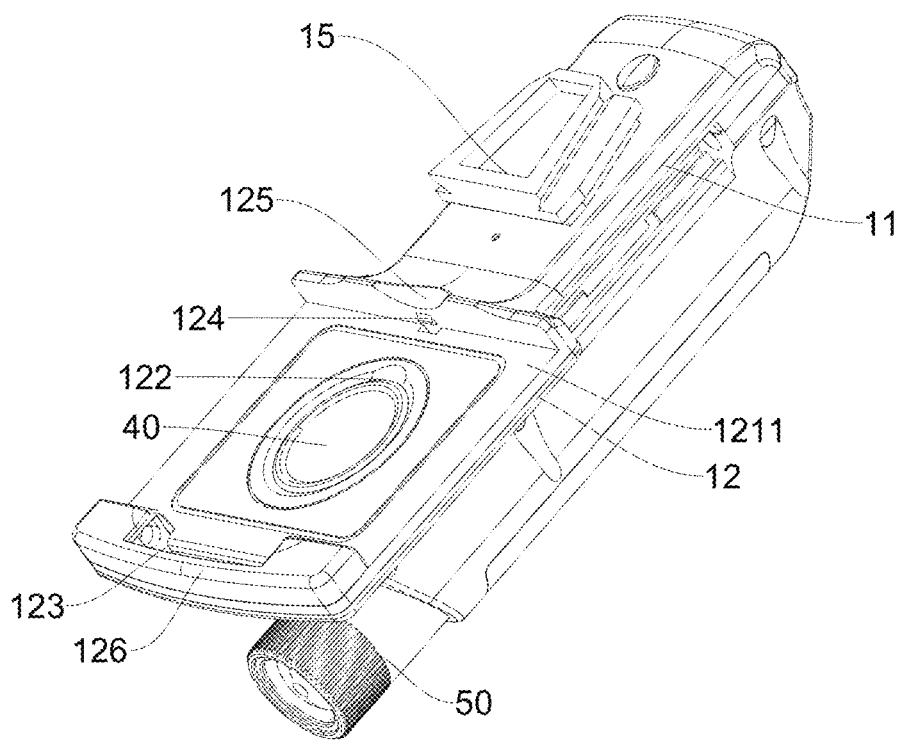
FIG. 7 is similar to FIG. 6, but shown from another view.
Figure 8:
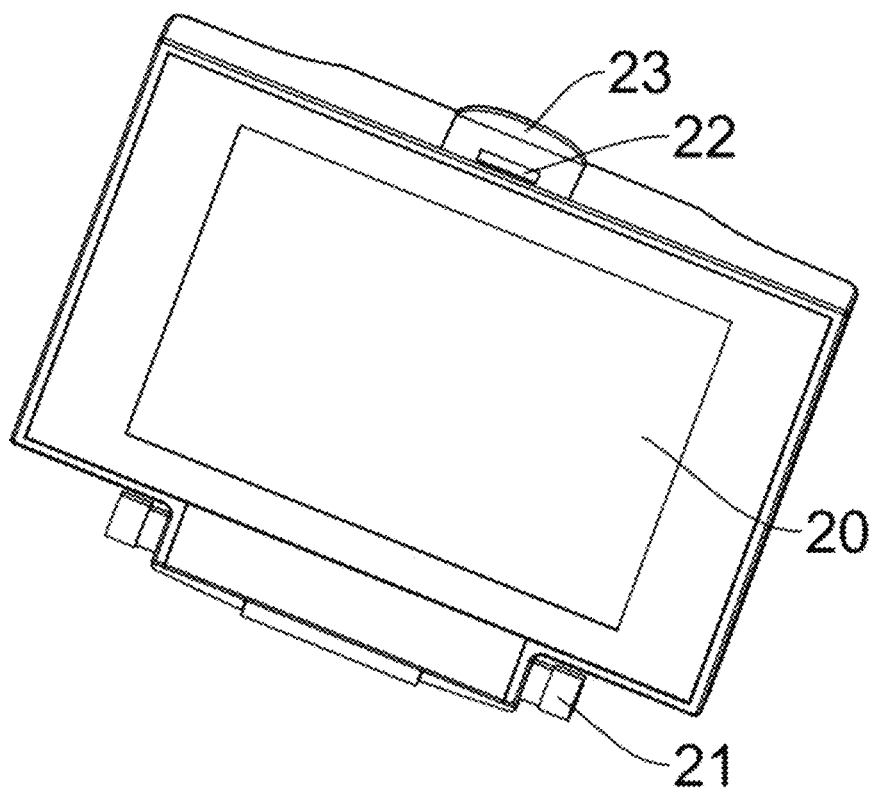
FIG. 8 is a schematic view of the outer screen of the night vision device of FIG. 1.
Figure 9:
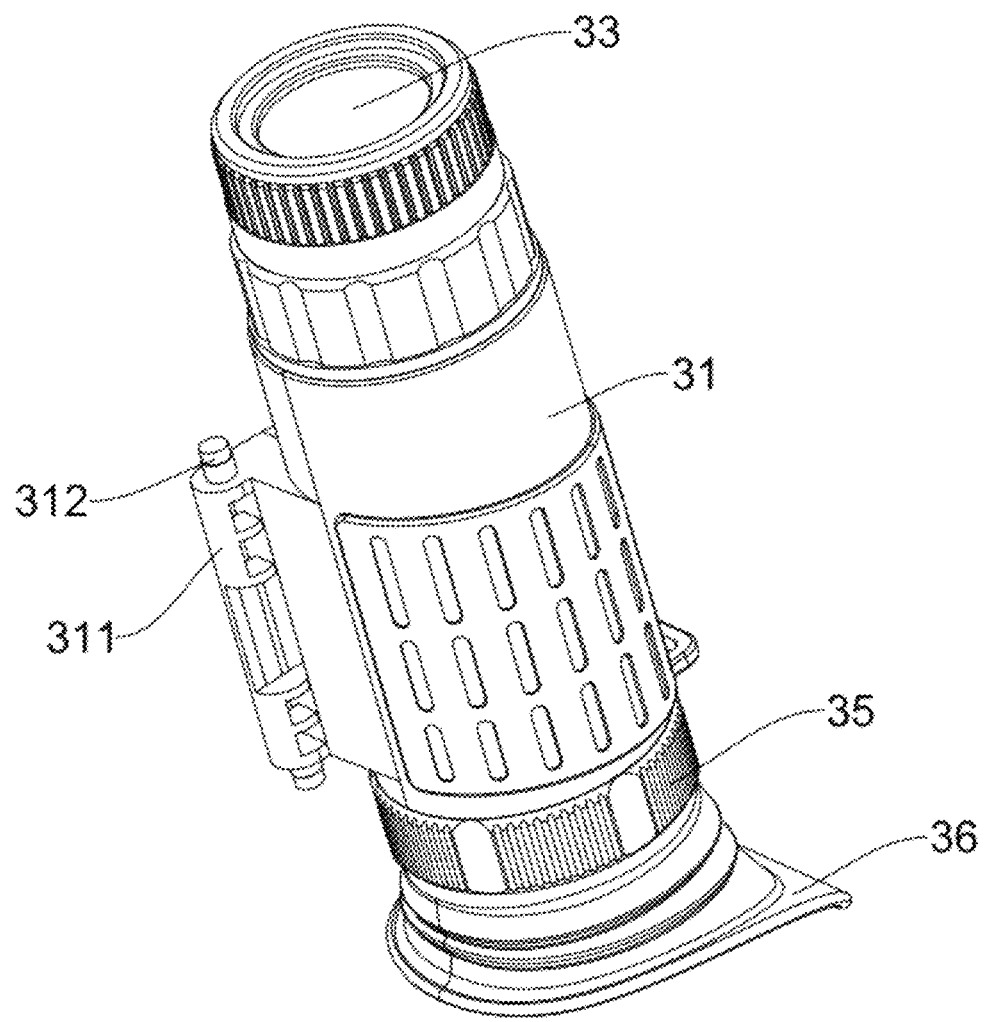
FIG. 9 is a schematic view of a barrel member of the night vision device of FIG. 1.

Referring to FIGS. 1-9, a night vision device according to an embodiment of the present disclosure includes a base 10, an outer screen 20 and two barrel members 30, the two barrel members 30 respectively hinged on the base 10 and rotated to adjust a distance therebetween. The two barrel members 30 respectively correspond to two eyes of a user for observing the surroundings. A distance between the two eyes of different users is different. Both the two barrel members 30 are hinged to the base 10, so that the two barrel members 30 can rotate to adjust the distance between the two barrel members 30 to adapt to different users. The outer screen 20 is installed on the base 10 and configured to display images of the outside world.

The base 10 includes a main member 11 and a receiving member 12 arranged on a side of the main member 11, a width of the main member 11 smaller than that of the receiving member 12. The main member 11 includes two arc-shaped recesses 13 symmetrically arranged thereof for respectively receiving the two barrel members 30 therein. The two barrel members 30 are located on the same side of the receiving member 12, and the outer screen 20 is hinged on the receiving member 12, so that the outer screen 20 can be folded or unfolded relative to the receiving member 12. When a user needs to watch through the night vision device, the outer screen 20 rotate to be unfolded. When the outer screen 20 is unfolded, the outer screen 20 is arranged facing two eyes of the user so that the user can directly view contents that are displayed on the outer screen 20. When the outer screen 20 is folded to be convenient for being carried to protect screens of the outer screen 20. The night vision device of the present disclosure can observe the outside world through the two barrel members 30, and can also observe the outside world through the outer screen 20, which is convenient for being used by users.

Each of the two barrel members 30 includes a body 31, an eyepiece member 32, an objective lens member 33 and an inner screen 34, the eyepiece member 32 and the objective lens member 33 respectively arranged on two opposite ends of the body 31, and the inner screen 34 arranged inside the body 31. When the night vision device is used, users can observe outer environments from the objective lens member 33 by facing their eyes directly towards the eyepiece member 32.

An opening 14 is formed on each of the two recesses 13 of the base 10, and the body 31 includes an inserting member 311 correspondingly inserted into the opening 14, and a first rotating member 312 (shown in FIG. 9) arranged on the inserting member 311 and hinged within the opening 14. Both the inserting member 311 and the first rotating member 312 are set, so that the barrel member 30 can rotate around the first rotating member 312 to adjust the distance between the two barrel members 30 to adapt to different users.

In an optical embodiment of the present disclosure, the receiving member 12 includes a receiving room 121, the outer screen 20 received in the receiving room 121. The night vision device further includes a compass 40, and a receiving chamber 122 is formed on a bottom wall 1211 of the receiving room 121 and configured to receive the compass 40 therein. When the outer screen 20 is unfolded, the compass 40 is exposed to the outside world, and the user can use the compass 40 to determine a direction in the field. In an embodiment of the present disclosure, when the outer screen 20 is folded, the compass 40 can be hidden, which is reasonable for using spaces thereof, has a beautiful appearance and is convenient to use the night vision device.

A groove 123 is formed at an end of the receiving member 12 that is close to the objective lens member 33, and the outer screen 20 includes a second rotating member 21 corresponding to the groove 123 and hinged within the groove 123. Such structure is provided to unfold and fold the outer screen 20 so that the screen of the outer screen 20 can face the eyes of the uses for easily viewing from the outer screen 20, after the outer screen 20 is unfolded. In an embodiment of the present disclosure, an angle range of the outer screen 20 that is unfolded is from 0 to 105 degrees. A fixing portion 126 is provided to control the angle of the outer screen 20 that is unfolded, or the angle of the outer screen 20 that is unfolded can be obtained through damping hinges. The fixing portion 126 directly faces the groove 123, and the outer screen 20 is positioned through the fixing portion 126 after the outer screen 20 is unfolded.

The outer screen 20 further includes a clamping portion 22 arranged at an end of the outer screen 20 away from the second rotating member 21, and the receiving member 12 includes a clamp 124 corresponding to the clamping portion 22 and clamped with the clamping portion 22, so as to position the outer screen 20.

In an optical embodiment of the present disclosure, the outer screen 20 further includes a protrusion 23 arranged on the end of the outer screen 20 away from the second rotating member 21, and the receiving member 12 includes an installing portion 125 corresponding to the protrusion 23, and the protrusion 23 arranged inside the installing portion 125. By setting the protrusion 23, it is convenient for users to pinch the night vision device with their fingers to easily unfold and fold the outer screen 20.

The night vision device further includes a lamp 50 arranged on the base 10 and oriented in the same direction as the objective lens member 33. The lamp 50 faces outwardly to illuminate the environment outside the objective lens member 33, so that it is convenient for users to view the outside world in dimly lit environments.

In an optical embodiment of the present disclosure, the base 10 includes a connecting portion 15 connected with a head wearing device. When using the night vision device, users can connect the head wearing device to two connecting portions 15, so as to wear the night vision device on their head or hang the night vision device around their neck to prevent the night vision device from falling off and reduce the risk of damaging the night vision device. The head wearing device can be a helmet, a headband, or other shaped structures.

In an optical embodiment of the present disclosure, a supporting portion 16 is arranged on a side of the main member 11 facing away from the outer screen 20 and configured to connect with an external bracket. The supporting portion 16 is provided to fix the night vision device of the present disclosure on the external bracket, so that the night vision device of the present disclosure can be applicable for a plurality of situations.

The night vision device further includes a main circuit board 80 electrically connected to all of the objective lens member 33, the inner screen 34 and the outer screen 20.

In an embodiment of the present disclosure, there are two objective lens members 33 included in the night vision device, one of the two objective lens members 33 including a camera module 60 and the other of the two objective lens members 33 including an infrared module 70. The camera module 60 is configured to capture an external environment of the objective lens member 33, while the infrared module 70 is configured to sense external heat sources. The night vision device further includes a first circuit board 81 and a second circuit board 82, the first circuit board 81 received in one body 31, and the second circuit board 82 received in the other body 31. The first circuit board 81 is electrically connected to the camera module 60, the second circuit board 82 is electrically connected to the infrared module 70, and the main circuit board 80 is electrically connected to all of the first circuit board 81, the second circuit board 82 and the outer screen 20.

In an embodiment of the present disclosure, the night vision device further includes a plurality of control buttons 90 installed on the body 31 and connected to the first circuit board 81 and the second circuit board 82. The plurality of control buttons 90 is provided to control the night vision device. Specifically, the night vision device includes six control buttons 90, three control buttons 90 are set on one body 31 and connected to the first circuit board 81, and the other three control buttons 90 are set on the other body 31 and connected to the second circuit board 82.

In an optical embodiment of the present disclosure, the barrel member 30 further includes a focusing member 35 configured to connect the body 31 and the eyepiece member 32. The focusing member 35 can adjust a distance between the eyepiece member 32 and the inner screen 34. The focusing member 35 is provided to adjust light output from the eyepiece member 32 to adapt to users with different visual acuities. Specifically, the focusing member 35 includes an inner barrel and a rotating barrel, an arc-shaped groove arranged on the inner barrel. The arc-shaped groove is S-shaped and can be arranged with only one or two symmetrically. A sliding block is connected to the eyepiece member 32 and matched with the arc-shaped groove. The rotating barrel sleeves around the inner barrel, and rotates to drive the inner barrel to rotate, so that the sliding block moves along the arc-shaped groove, thereby the eyepiece member 32 being close to or away from the inner screen 34.

In an optical embodiment of the present disclosure, the night vision device further includes an eye protecting cover 36 made of a flexible and skin friendly material and installed on the eyepiece member 32. An inner diameter of the eye protecting cover 36 gradually increases along a direction away from the objective lens member 33, so that the eye protecting cover 36 is taken as a trumpet-like shape to fit an eye frame of the user and improve a usage experience thereof.

The night vision device of the present disclosure provides that the two barrel members 30 are hinged with the base 10 so that the distance between the two barrel members 30 (that is: adjusting a pupil distance thereof) within a certain range can be adjusted, so as to adapt to users with different pupil distances. The two barrel members 30 are also convenient for being gripped by users. There are two arc-shaped recesses 13 arranged on the base 10 to provide a sufficient space for installing the two barrel members 30, which has a compact structure thereof. The width of the receiving member 12 of the base 10 is also enough to install the outer screen 20 thereof, so that the outer screen 20 is easy to be unfolded and folded for users to observe. Users can directly observe the outside world through the barrel member 30, as well as the outer screen 20, and users can also use a recording mode thereof to obtain an effect of taking photos and videos, which has a plurality of functions and is convenient for being used and recorded.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A night vision device comprising a base, an outer screen and two barrel members, the two barrel members respectively hinged on both sides of the base and rotated to adjust a distance therebetween, the outer screen installed on the base and configured to display images of the outside world; and the base comprising a main member and a receiving member arranged on a side of the main member, a width of the main member smaller than that of the receiving member, the main member comprising two arc-shaped recesses for respectively receiving the two barrel members therein; the two barrel members located on the same side of the receiving member, and the outer screen hinged on the receiving member.

2. The night vision device as claimed in claim 1, wherein each of the two barrel members comprises a body, an eyepiece member, an objective lens member and an inner screen, the eyepiece member and the objective lens member respectively arranged on two opposite ends of the body, and the inner screen arranged inside the body.

3. The night vision device as claimed in claim 2, wherein an opening is formed on each of the two recesses, and the body comprises an inserting member correspondingly inserted into the opening, and a first rotating member arranged on the inserting member and hinged within the opening.

4. The night vision device as claimed in claim 2, wherein the night vision device further comprises a main circuit board arranged within the base and electrically connected to all of the two objective lens member, the two inner screen and the outer screen.

5. The night vision device as claimed in claim 4, wherein the night vision device further comprises a lamp arranged on the base and oriented in the same direction as the objective lens member.

6. The night vision device as claimed in claim 4, wherein one of the two objective lens members comprising a camera module and the other of the two objective lens members comprising an infrared module.

7. The night vision device as claimed in claim 6, wherein the night vision device further comprises a first circuit board and a second circuit board, the first circuit board electrically connected to the camera module, the second circuit board electrically connected to the infrared module, and the main circuit board electrically connected to all of the first circuit board, the second circuit board and the outer screen.

8. The night vision device as claimed in claim 7, wherein the night vision device further comprises a plurality of control buttons installed on the body, some of the plurality of control buttons connected to the first circuit board, and others of the plurality of control buttons connected to the second circuit board.

9. The night vision device as claimed in claim 2, wherein the receiving member comprises a receiving room, the outer screen received in the receiving room.

10. The night vision device as claimed in claim 9, wherein the night vision device further comprises a compass, and a receiving chamber is formed on a bottom wall of the receiving room and configured to receive the compass therein.

11. The night vision device as claimed in claim 10, wherein a groove is formed at an end of the receiving member that is close to the objective lens member, and the outer screen comprises a second rotating member corresponding to the groove and hinged within the groove.

12. The night vision device as claimed in claim 11, wherein the outer screen further comprises a clamping portion arranged at an end of the outer screen away from the second rotating member, and the receiving member comprises a clamp corresponding to the clamping portion and clamped with the clamping portion.

13. The night vision device as claimed in claim 12, wherein the outer screen further comprises a protrusion arranged on the end of the outer screen away from the second rotating member, the receiving member comprising an installing portion corresponding to the protrusion, and the protrusion arranged inside the installing portion.

14. The night vision device as claimed in claim 2, wherein each of the two barrel members further comprises a focusing member configured to connect the body and the eyepiece member.

15. The night vision device as claimed in claim 2, wherein the night vision device further comprises an eye protecting cover installed on the eyepiece member.

16. The night vision device as claimed in claim 15, wherein an inner diameter of the eye protecting cover gradually increases along a direction away from the objective lens member.

* * * * *